(12) United States Patent
Hedges et al.

(10) Patent No.: US 11,099,912 B1
(45) Date of Patent: Aug. 24, 2021

(54) PROCESSING COMPUTATIONALLY INTENSIVE WORKLOADS

(71) Applicant: AMAZON TECHNOLOGIES, INC., Seattle, WA (US)

(72) Inventors: Linda Hedges, Kirkland, WA (US); Dougal Stuart Ballantyne, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 936 days.

(21) Appl. No.: 15/196,850

(22) Filed: Jun. 29, 2016

(51) Int. Cl.
   G06F 9/54       (2006.01)
   G06F 9/50       (2006.01)

(52) U.S. Cl.
   CPC .............. G06F 9/542 (2013.01); G06F 9/505 (2013.01)

(58) Field of Classification Search
   None
   See application file for complete search history.

(56) References Cited

U.S. PATENT DOCUMENTS

| | | | | |
|---|---|---|---|---|
| 7,418,715 | B2* | 8/2008 | Pereira ..................... | H04L 67/02 719/318 |
| 2011/0099537 | A1* | 4/2011 | Van Ness ................ | G06F 9/541 717/120 |
| 2012/0124584 | A1* | 5/2012 | Addala .................... | G06F 9/542 718/102 |
| 2013/0174165 | A1* | 7/2013 | Chopra ............... | G06F 11/1482 718/102 |
| 2014/0137136 | A1* | 5/2014 | Zhang ..................... | G06F 9/542 719/318 |
| 2015/0212811 | A1* | 7/2015 | Miller ..................... | G06F 9/542 717/120 |
| 2017/0168879 | A1* | 6/2017 | Dann ...................... | G06F 9/542 |

* cited by examiner

*Primary Examiner* — Chat C Do
*Assistant Examiner* — William C Wood
(74) *Attorney, Agent, or Firm* — Thomas | Horstemeyer, LLP

(57) ABSTRACT

A method for processing computationally intensive workloads includes monitoring a storage system to determine what portion of results of computations associated with an application have been received by the storage system. Responsive to the monitoring determining that the portion of results is sufficient to trigger allocation of one of a plurality of event handlers to the application to process the portion of results: an event handler is allocated to the application, the portion of the results is retrieved from the storage system, a specification of a first computation to be performed and the portion of the results are provided to the event handler, the event handler applies the first computation to the portion of results to produce a new result, the new result is stored in the storage system, and the event handler is deallocated from the application.

20 Claims, 9 Drawing Sheets

PROCESSING COMPUTATIONALLY INTENSIVE WORKLOADS

BACKGROUND

High Performance Computing (HPC) generally refers to a class of computing directed to solving computationally intensive problems. The applications to which HPC is generally applied may include, for example, scientific and engineering applications, (e.g., partial differential equation computations, computational fluid dynamics, thermal analysis, etc.) that can be parallelized and run on parallel computer architectures. As such, HPC is often characterized by the computing systems applied to model, simulate, or analyze complex physical phenomena. A conventional HPC system includes numerous clusters of one or more processors that are applied in parallel to compute a solution. For most large scientific and engineering applications, performance is largely determined by the degree to which the application can be parallelized.

BRIEF DESCRIPTION OF THE DRAWINGS

For a detailed description of various examples, reference will now be made to the accompanying drawings in which.

DETAILED DESCRIPTION

Figure 1:
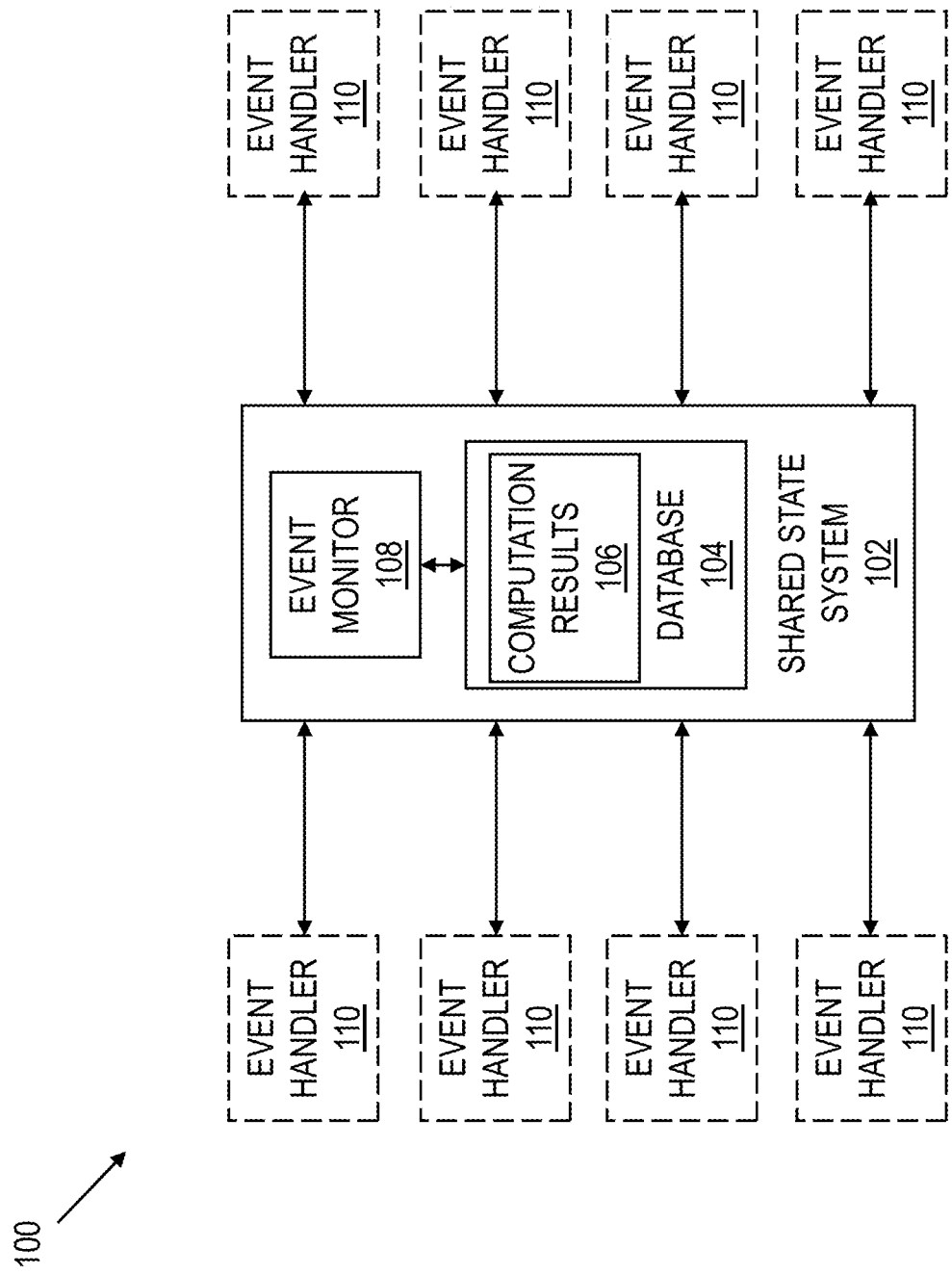
FIG. 1 shows block diagram for a system for processing computationally intensive workloads in accordance with various embodiments.

The present disclosure is directed to technologies for processing computationally intensive workloads, such as the applications conventionally associated with high performance computing (HPC). More specifically, the system and method disclosed herein are directed to novel solutions that improve the efficiency of processing the types of applications generally associated with HPC, and other computationally intensive workloads. Embodiments may improve overall processing efficiency by allocating computing resources based on the availability of results generated by ongoing processing of the application. Availability of results may trigger allocation of computing resources to further processing of the application. Thus, processing as disclosed herein may be considered to be event driven, wherein availability of new or changed data to be processed constitutes an event. Detection of an event triggers allocation of computing resources to process the event. When processing of the event is complete, the computing resources allocated to process the event may be deallocated. Thus, only the computing resources needed to perform processing that may produce changes in the results of the application are allocated to the application at any given time. If fewer input value changes are detected, then fewer computing resources are allocated to the application. Similarly, if more input value changes are detected, then more computing resources are allocated to the application. In this way, processing efficiency can be improved by eliminating superfluous processing that has little or no effect on the ultimate results of an application.

When implemented using a network-based computing system, the improvements in processing efficiency provided by the techniques disclosed herein may also reduce the overall cost to process a given application by reducing or minimizing the computing resources allocated to processing the application. While overall cost of computing resources may be reduced, a high level of processing performance may be maintained by providing a high degree of parallelization. For example, each event (e.g., each set of new input data) may be processed by a different computing device, and as many different computing devices as are needed to process a maximum number of concurrent events in the application may be available for allocation. In a network-based computing system, the computing resources available for allocation to an application may include virtual machine instances, container-based computing assets, servers, etc., any of which may provide general purpose central processing unit (CPU) capabilities, graphics processing unit (GPU) capabilities, dedicated or programmable application specific logic, and/or other processing capabilities.

Embodiments of the present disclosure may also provide more robust processing of an application than is available using conventional HPC methods. For example, in a conventional HPC system specific computing resources (e.g., a specific processor) may be dedicated to performing specific computations for the entirety of application execution. Failure of the computing resources may require that the application be aborted and/or restarted. In the techniques disclosed herein, computing resources are transitory and allocated for use in a single computation and thus are not dedicated to the application. Accordingly, failure of a computing resource affects only the single computation being performed by the resource, and the failure can be ignored or corrected by allocation of a different computing resource to perform the computation.

To facilitate the use of computing resources that are transitory in nature, the computing resources maintain no state information that indicates the condition, history, or progress of ongoing computations. That is, in embodiments disclosed herein, the computing resources applied to perform computations in an application are stateless. Because the computing resources are stateless, no particular computing resource need be applied to perform a given computation. Thus, embodiments can advantageously select and allocate any of a wide variety of different computing resources to perform a computation responsive to an event.

Embodiments may apply a shared state system that maintains computation results for the application. The shared state system may include a central database, or other central data storage structure, to store results of computation provided by the transitory computing resources. As referred to herein, a "database" is a storage system configured to provide information storage and retrieval. A database may include a relational database as known in the art, an object oriented database as known in the art, or any other data storage structure arranged to provide information storage and retrieval. Storage of the database may be provided by semiconductor memory to allow quick access to computation results needed for computation by the computing resources, and/or for quick access to computation results for event detection. In various embodiments, storage of the database may be provided using magnetic, optical, or other storage technologies. The shared state system may also include event detection that accesses the database to monitor updating of computation results by the computing resources. The event detection may be built into the database, or provided as additional logic that accesses the database.

In one example, the event detection may be configured to detect an event and trigger computation if M of N (M≤N) possible input values to the computation have been updated. Inputs to a computation may be retrieved by the event detection, or other logic, and passed to a computing resource that is dynamically allocated to perform a computation. Information specifying the computation to be performed may also be retrieved from the database by the event detection, or other logic, and passed to the computing resource. Alternatively, information regarding the location of input values and specific computation to be performed may be passed to the allocated computing resource, and the computing resource may access the database to retrieve the input values and computation parameters. Generally speaking, for any computation to be performed, only the information needed to perform the computation is retrieved from the database and provided to the computing resource that is to perform the computation.

Event detection may also consider other factors in determining whether to trigger a given computation. In some embodiments, time since a last update of the given computation and/or value of importance of the given computation may be considered in detecting an event and triggering computation. For example, a value of importance may be assigned to the given computation in correspondence with a rate of change of results of the computation. A higher value of importance may result in earlier triggering of the given computation, e.g., triggering based on fewer updated inputs to the computation. Time related criteria may set a time from a last update of a computation result by which a further update of the computation result is to be triggered.

FIG. 1 shows block diagram for a system 100 for processing computationally intensive workloads in accordance with various embodiments. The system includes a shared state system 102 and one or more event handlers 110. The event handlers 110 are transitory computing resources that are allocated to the system 100 for the time needed to perform a specific computation. When the computation is complete, the event handler 110 is released and deallocated from the system 100. Accordingly, the number event handlers 110 allocated to the system may vary widely depending on the instantaneous computational requirements of the application being executed by the system 100. At a first point in time, relatively few event handlers 110 may be needed to perform the computations associated with an application, while at a second point in time many more event handlers 110 may be needed to perform application associated computations. At each point in time, only as many event handlers 110 as are needed to perform computations for the application at that time are allocated to the system 100, and each of the event handlers 110 remain allocated to the system 100 for only as long as needed to perform an assigned computation.

The transitory nature of the event handlers 110 is illustrated by the use of dashed lines in FIG. 1. Because the event handlers 110 are transitory, at one point in time a given computation may be performed by a first event handler 110, and at different time the result of the given computation may be updated by a different event handler 110. The event handlers 110 are also stateless. That is, when an event handler 110 is allocated to perform a computation, the event handler 110 has no information regarding any computation previously performed in association with the application. When the event handler 110 completes a computation and is deallocated, all state information relevant to the computation is lost from the perspective of the event handler 110.

An event handler 110 may be embodied in any of a variety of computing resources. For example, an event hander 110 may include virtual machine instances, container-based computing assets, servers, etc., any of which may provide general purpose CPU capabilities, GPU capabilities, dedicated or programmable application specific logic, and/or other processing capabilities.

The shared state system 102 controls the allocation of the event handlers 110 for processing of an application. Generally, the shared state system 102 monitors the results of application computations, and determines based on the availability of results produced by prior computations, and/or other factors, whether an event handler 110 should be allocated to compute a new result based on the available results that are relevant to computation of the new result. The shared state system 102 includes a database 104 and an event monitor 108. In some embodiments, the event monitor 108 may be incorporated into the database 104. The database 104 stores computation results 106 produced by the event handlers 110 as part of processing of an application. The computation results may include values computed by an event handler 110, and may also include any state information needed to continue or perform the computation in a different event handler 110, or perform successive computations in a different event handler 110. The database 104 may be formed in semiconductor memory or any other storage medium suitable for providing low latency access to the computation results 106. The database 110 may be any storage system capable of storing the results of application computation, state information, computation parameters, and/or other information needed to process a given application in the system 100. In various embodiments, the database 110 may include a relational database, an object oriented database, a NoSQL database, or any other storage structure suitable for storing the results of application computation, state information, computation parameters, and/or other information needed to process a given application in the system 100.

The event monitor 108 is configured to track the updating of computation results generated by the event handlers 110, and based on criteria defining the conditions for performing a given computation, allocate an event handler 110 to perform the given computation. An event, as detected by the event monitor 108, includes the presence of conditions, such as updated computation results, that dictate the allocation of an event handler 110 to process the updated computation results. For example, an engineering application may simulate a condition at any number of points (e.g., millions or billions of different points) of a physical structure, and computation of the condition of each point at any particular time may be triggered by updating of computation results stored in the database 104 that serve as inputs to computation of the point. Accordingly, for each point to be simulated, the event monitor 110 may include criteria for triggering computation of a value corresponding to the point. In some embodiments, such triggering criteria may include update or change of a number of input values to a computation, an importance value assigned to the point, and/or a maximum time from a last computation of a value for the point. For example, if N selected computation result values serve as inputs to computation of a value for a given point, then the event monitor 108 may be configured to monitor the N computation result values for updates, and when the N computation result values have been updated the event monitor 108 may trigger allocation of an event handler 110 to compute a new value for the given point. The event monitor 108 may include logic and processing capability to monitor any number of points defined in the application for input value updates that trigger recomputation of the point. In this manner, the shared state system 102 computes each point of the simulation "as needed," and no processing resources are wasted on computations that may produce little or no change in the resulting value. For example, the event monitor 108 may include event monitoring logic embodied in software instructions executed by a processor, where the instructions cause the processor to monitor the database 104 to identify whether a sufficient number of the results 106 have been received by the database to trigger allocation of one of the event handlers 110 to process at least a portion of the results 106. In some embodiments, each event handler 110 may correspond to computation of a result value at a point of a simulation, and the event monitor 108 may trigger allocation of as many event handlers 110 as are needed to update points at a given time.

As noted above, an importance value may also be assigned to each computation, or each point associated with a computation. In some embodiments, importance determination logic associated with the database 104 may assign or adjust importance values associated with computation results. The importance value may affect the timing of event handler 110 allocation and computation of a result value. A higher importance value may result in earlier computation, and a lower importance value may result in later computation. For example, a higher importance value may cause the event monitor 108 to trigger computation based on fewer results input to a computation having been updated, and a lower importance value may cause the event monitor 108 to trigger computation based on more results input to a computation having been updated. Thus, a higher importance value may trigger recomputation of a result earlier than a lower importance value. In some embodiments, an importance value may be adjusted based on a rate of change or magnitude of change of a result value. That is, if a result value's rate of change or magnitude of change is higher, then the result value may be deemed likely to change more quickly in the future and the value's importance increased to provide for earlier update of the value. Similarly, if a result value's rate of change or magnitude of change is lower, then the result value may be deemed likely to change less quickly in the future and the value's importance decreased to provide for later update of the value.

By only allocating computing resources, via an event handler 110, when sufficient input to the computation is available, the system 100 provides efficient utilization of computing resources. Because an event handler 110 may be allocated to each computation, the system 100 can maximize parallelization of a complex application, such as an engineering simulation. Additional features and operation of the system 100 are explained with reference to FIGS. 2-10.

Figure 2:
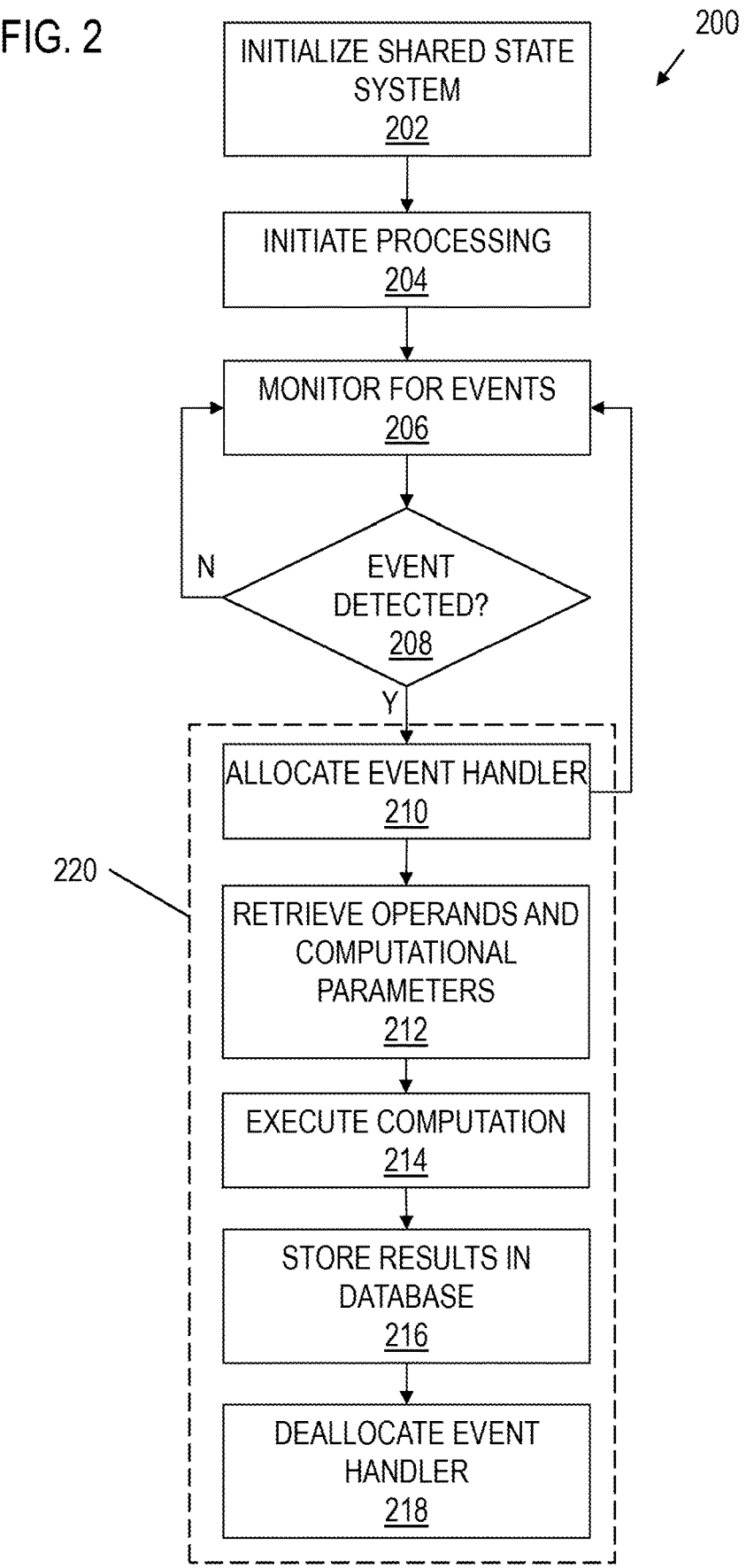
FIG. 2 shows a flow diagram for a method for processing computationally intensive workloads in accordance with various embodiments.

FIG. 2 shows a flow diagram for a method 200 for processing computationally intensive workloads in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 200 may be implemented by instructions executed by a computer of the network-based computing system in the system 100.

In block 202, the system 100 is initialized for a specific application. For example, the system 100 may be initialized to execute a computational fluid dynamics simulation, a financial analysis, a weather prediction, a thermal simulation, or other computationally intensive application. The initialization may include setting the database 104 and the event monitor 108 to a state suitable for execution of the computationally intensive application. Additional details of the initialization of the system 100 are explained with regard to FIG. 3.

In block 204, execution of the application is initiated. Initiation of the application may include providing an initial input value to selected computations and initiating the selected computations. Additional details of the initialization of the application are explained with regard to FIG. 4.

In block 206, the event monitor 108 tracks update of computation results that serve as inputs to each available computation. The tracking may include analyzing the computation results 106 stored in the database 104 for changes to the result values that serve as inputs to each computation. Additional details of the event monitoring are explained with regard to FIG. 5.

If, in block 208, no event is detected by the event monitor 108, then no event handler 110 is allocated, and event monitoring continues in block 206. If, in block 208, an event is detected, then the operations of block 220 are performed to execute a computation. The event monitoring and detection of blocks 206 and 208 may identify multiple events in parallel. For example, event monitoring and detection of blocks 206 and 208 may simultaneously identify an event with respect to every point of an application associated with a computation. Similarly, the operations of block 220 may be performed in parallel for as many events as are detected in block 208.

In block 210, an event handler 110 is allocated to process the event detected in block 208. That is, computing resources are assigned to the system 100 for the specific purpose of executing the computation identified as being ready for execution in blocks 206 and 208. The arrow from block 210 to block 206 indicates that monitoring for events continues while event processing is in progress. As explained above, event monitoring and detection may be a continuous process that monitors for and detects any number of events in parallel with event processing. Additional details of the event handler allocation are explained with regard to FIG. 6.

In block 212, the allocated event handler 110 is configured to perform the computation. Configuration of the event handler 110 may include programming the event handler to perform the needed computation and retrieving, from the database 104, the computation results to be used as input (i.e., the operands) to the computation to be executed by the allocated event handler 110. In some embodiments, the allocated event handler 110 may be provided with information allowing the event hander 110 to access the database 110 and retrieve the operands to be processed and/or the computation to be performed. In some embodiments, the shared state system 102 may retrieve the computation results to be used as input to the computation from the database 104 and provide the retrieved operands to the allocated event handler 110.

In block 214, the event handler 110 executes the programmed computation, using the operands retrieved from the database 104 to produce a new result.

In block 216, the event handler 110 stores the new result in the database 104 as an updated result. Additional information stored in the database in conjunction with the new result may indicate a time at which the result was updated. That is, the new result may be time-stamped in the database 104. An importance value associated with the result may also be adjusted based on the updated computation result. For example, if a value of rate of change associated with the computation result is increased by the new result, then the importance value may be increased. Similarly, if a value of rate of change associated with the computation result is decreased by the new result, then the importance value may be decreased.

When the result of the computation has been stored in the database 102, the event handler 110 can be released from the system 100, and thus, in block 218, the event hander 110 that computed the new result is deallocated. In some embodiments, the shared state system 102 may deallocate the event handler 110 responsive to the updating of the computation result value in the database 104. In some embodiments, the event handler 110 may deallocate itself or cause itself to be deallocated after transferring the new result value to the database 104.

The method 200 continues with allocation of an event handler 110 to process each detected event for as long as the application executes. Application completion may be determined based on time of execution or degree of change in result of computations.

Figure 3:
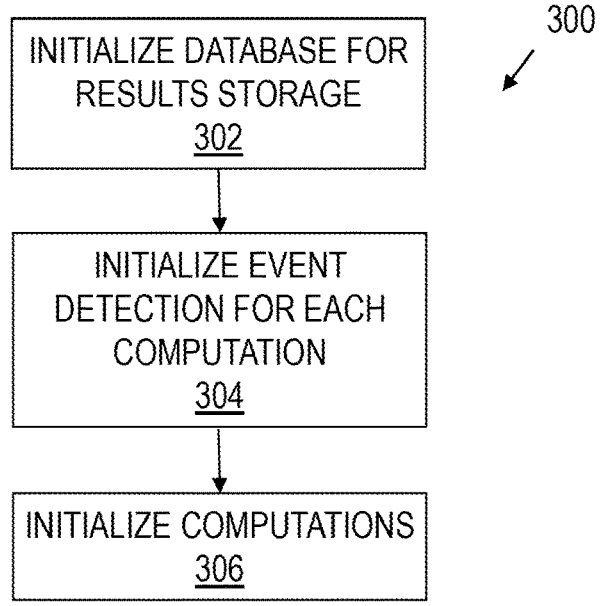
FIG. 3 shows a flow diagram for a method for initializing processing of computationally intensive workloads in accordance with various embodiments.

FIG. 3 shows a flow diagram for a method 300 for initializing processing of a computationally intensive workload in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be implemented by instructions executed by a computer of a network-based computing system in the system 100. Operations of the method 300 may be performed as part of the operations of block 202 of the method 200.

In block 302, the database 104 is initialized for storage of results generated by the event handlers 110 that perform computations for the application. For example, the database may be arranged to provide storage for a number and type of results generated by execution of the application, computation state information. Initial values for each result and/or state may be stored in the database.

In block 304, event detection for each computation is initialized. In various embodiments, the parameters of event detection may be initialized in the event monitor 108 or the database 104, which can be accessed by the event monitor 108. The initialization may include defining a relationship between each result generated by the application and different ones of the results that serve as inputs to a computation that produces the result. That is, particular results that serve as inputs used to generate a given result of computation are identified as inputs to the computation. An update threshold specifying a number of the inputs, the update of which will trigger recomputation of the given result, may be specified. An importance value may be assigned to each computation result. A maximum time between updates of each computation result may be defined.

In block 306, the particular computations to be performed to generate each result are defined. The computations associated with each result may be the same for all results or may be different for each or any of the results. The computations will be defined in accordance with the application to be executed. In some embodiments, information defining the computations to be performed may be stored in the database 102 in association with one or more results.

Figure 4:
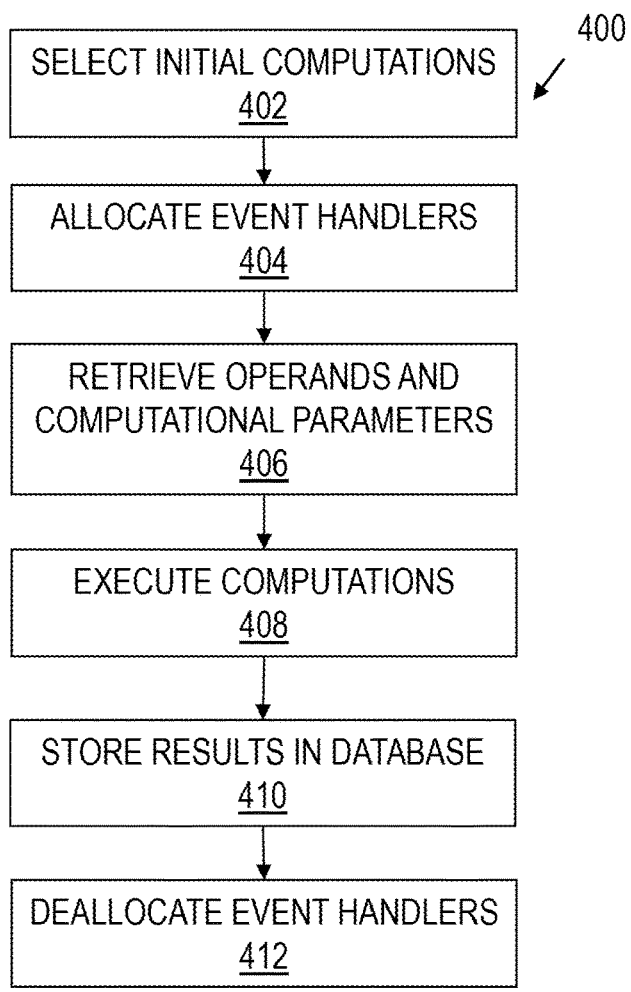
FIG. 4 shows a flow diagram for a method for initiating processing of computationally intensive workloads in accordance with various embodiments.

FIG. 4 shows a flow diagram for a method 400 for initiating processing of computationally intensive workloads in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be implemented by instructions executed by a computer of a network-based computing system in the system 100. Operations of the method 400 may be performed as part of the operations of block 204 of the method 200.

In block 402, the shared state system 102 selects initial computations of the application to be performed. One or more initial computations may be selected based on a point or points of a structure simulated by the application to which a simulated stimulus is applied, based on a random or pseudo-random selection, or based on other criteria associated with the application.

In block 404, the shared state system 102 allocates event handlers 110 to execute the initial computations. That is, computing resources are assigned to the system 100 for the specific purpose of executing the initial computation selected in block 402. Additional details of the event handler allocation are explained with regard to FIG. 6.

In block 406, each allocated event handler 110 is configured to perform the corresponding computation. Configuration of the event handler 110 may include programming the event handler to perform the needed computation and retrieving, from the database 104, the computation results to be used as input to the computation to be executed by the allocated event handler 110. In some embodiments, the allocated event handler 110 may be provided with information allowing the event hander 110 to access the database 110 and retrieve the operands to be processed. In some embodiments, the shared state system 102 may retrieve the computation results to be used as input to the computation from the database 104 and provide the retrieved operands to the allocated event handler 110.

In block 408, each event handler 110 executes the programmed computation, using the operands retrieved from the database 104 to produce a new result.

In block 410, each event handler 110 stores the new result in the database 104 as an updated result. Additional information stored in the database in conjunction with the new result may indicate a time at which the result was updated. An importance value associated with the result may also be adjusted based on the updated computation result. For example, if a value of rate of change associated with the computation result is increased by the new result, then the importance value may be increased. Similarly, if a value of rate of change associated with the computation result is decreased by the new result, then the importance value may be decreased.

When each result of a computation has been stored in the database 102, the event handler(s) 110 can be released from the system 100, and in block 412, the event hander(s) 110 that computed the initial result is deallocated. In some embodiments, the shared state system 102 may deallocate each event handler 110 responsive to the updating of the corresponding computation result value in the database 104. In some embodiments, each event handler 110 may deallocate itself or cause itself to be deallocated after transferring the new result value to the database 104.

Figure 5:
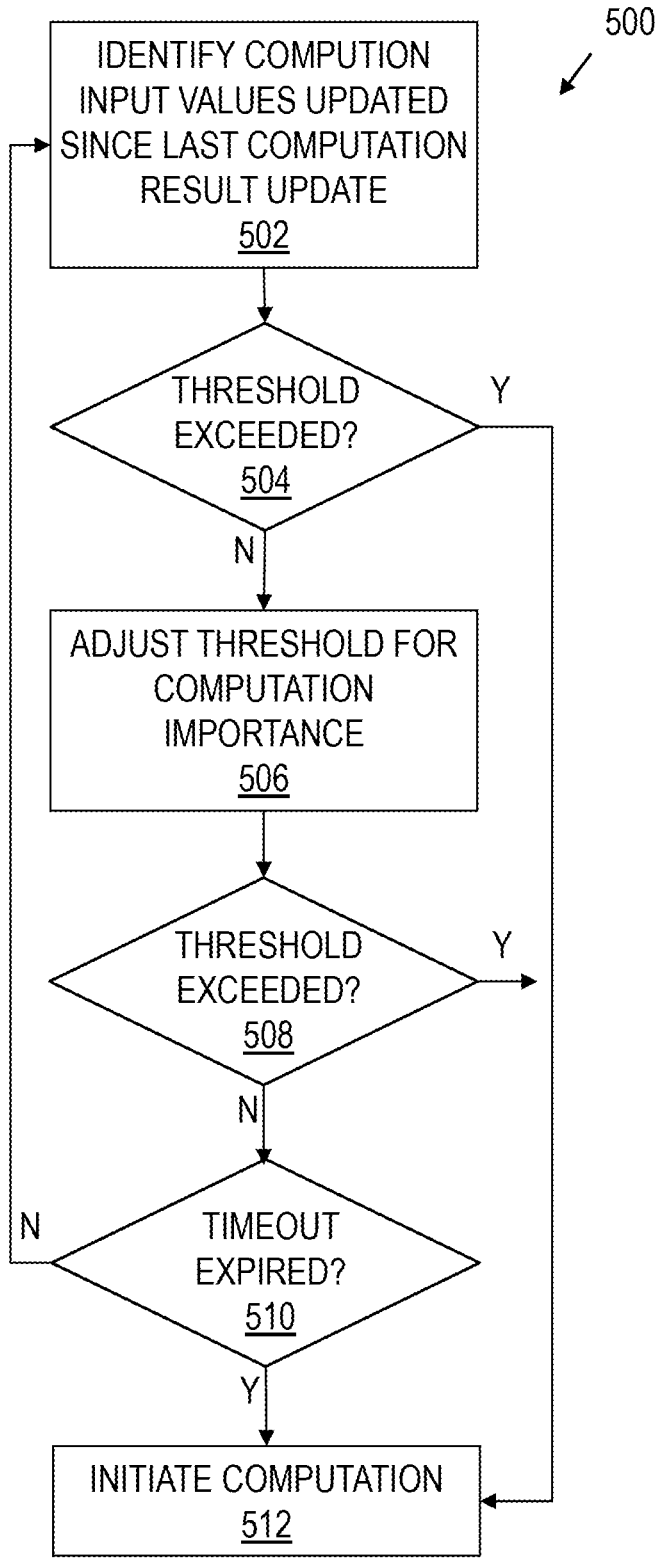
FIG. 5 shows a flow diagram for a method for event detection associated with processing of computationally intensive workloads in accordance with various embodiments.

FIG. 5 shows a flow diagram for a method 500 for event detection associated with processing of computationally intensive workloads in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be implemented by instructions executed by a computer of a network-based computing system in the system 100. Operations of the method 500 may be performed as part of the operations of block 206 of the method 200.

In the method 500, the event monitor 108 tracks the updating of results in the database 104 to determine which of the computation results should be updated. Monitoring of the computation results is a repeated process in which the event monitor 108 may constantly track the updating of computation results to determine which of the computation results should be updated.

In block 502, for each given computation result, the event monitor 108 identifies other computation results that serve as inputs to the computation that produces the given computation result, and identifies which of the input results has been updated since the given computation result was last updated. The event monitor 108 may retrieve information regarding the timing of input value updates from the database 104. Based on the information retrieved from the database, the event monitor 108 may determine the number of input results that have been updated since the given computation result was last updated.

In block 504, the event monitor 108 determines whether the number of input results updated since the given computation result was last updated exceeds a threshold value set for the given computation result. If the number of input results that were updated since the given computation result was last updated exceeds the threshold value, then the event monitor 108 proceeds to initiate recomputation of the given result in block 512.

If the number of input results updated since the given computation result was last updated does not exceed the threshold value, then the event monitor 108 may adjust the threshold to account for computation importance in block 506. For example, if the given computation has been assigned a value indicating high importance, then the value of the threshold may be reduced by an amount corresponding to the importance. In some embodiments, importance values may relate to predefined increments in threshold. In block 508, the event monitor 108 determines whether the number of input results updated since the given computation result was last updated exceeds the adjusted threshold value.

If the number of input results updated since the given computation result was last updated exceeds the adjusted threshold value, then the event monitor 108 proceeds to initiate computation of the given result in block 512.

If the number of input results updated since the given computation result was last updated does not exceed the adjusted threshold value, then the event monitor 108 may determine whether an elapsed time since a last update of the given computation result exceeds a predetermined timeout value. If the elapsed time since a last update of the given computation result exceeds the predetermined timeout value, then the event monitor 108 proceeds to initiate computation of the given result in block 512.

Figure 6:
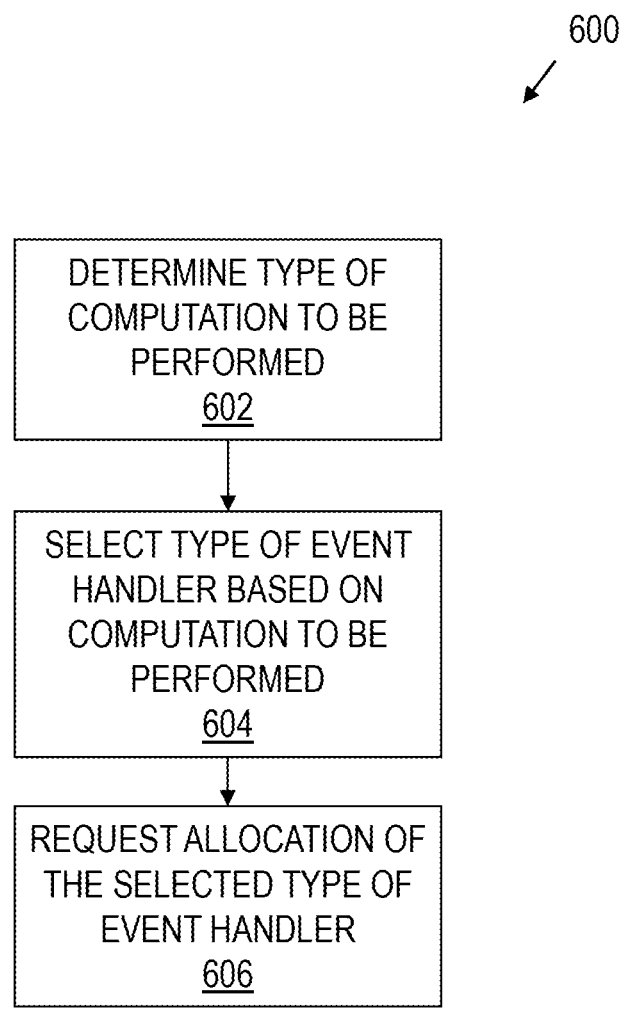
FIG. 6 shows a flow diagram for a method for event handler allocation associated with processing of computationally intensive workloads in accordance with various embodiments.

FIG. 6 shows a flow diagram for a method 600 for event handler allocation associated with processing of computationally intensive workloads in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be implemented by instructions executed by a computer of a network-based computing system in the system 100. Operations of the method 600 may be performed as part of the operations of block 210 of the method 200.

In block 602, the shared state system 102 determines the type of computation to be performed. For example, information stored in the database 104 may indicate that the computation to be performed includes integer or floating point arithmetic, graphics computations, or application specific computations such as data encoding or decoding.

In block 604, the shared state system 102 selects a type event handler 110 to be allocated for execution of the computation. A type of event handler 110 capable of most efficiently performing the type of computation identified in block 602 may be selected. Any number of different types of event handlers 110, where different types of event handlers 110 have different computational capabilities, may be available for allocation to the system 100. For example, event handlers 110 available for allocation to the system 100 may include computational resources based on general-purpose CPUs, GPUs, application specific processors such as programmable logic based devices, and other types of processing units.

In block 606, the shared state system 102 requests allocation of an instance handler 110 of the type deemed best suited to handling the computation to be executed.

Figure 7:
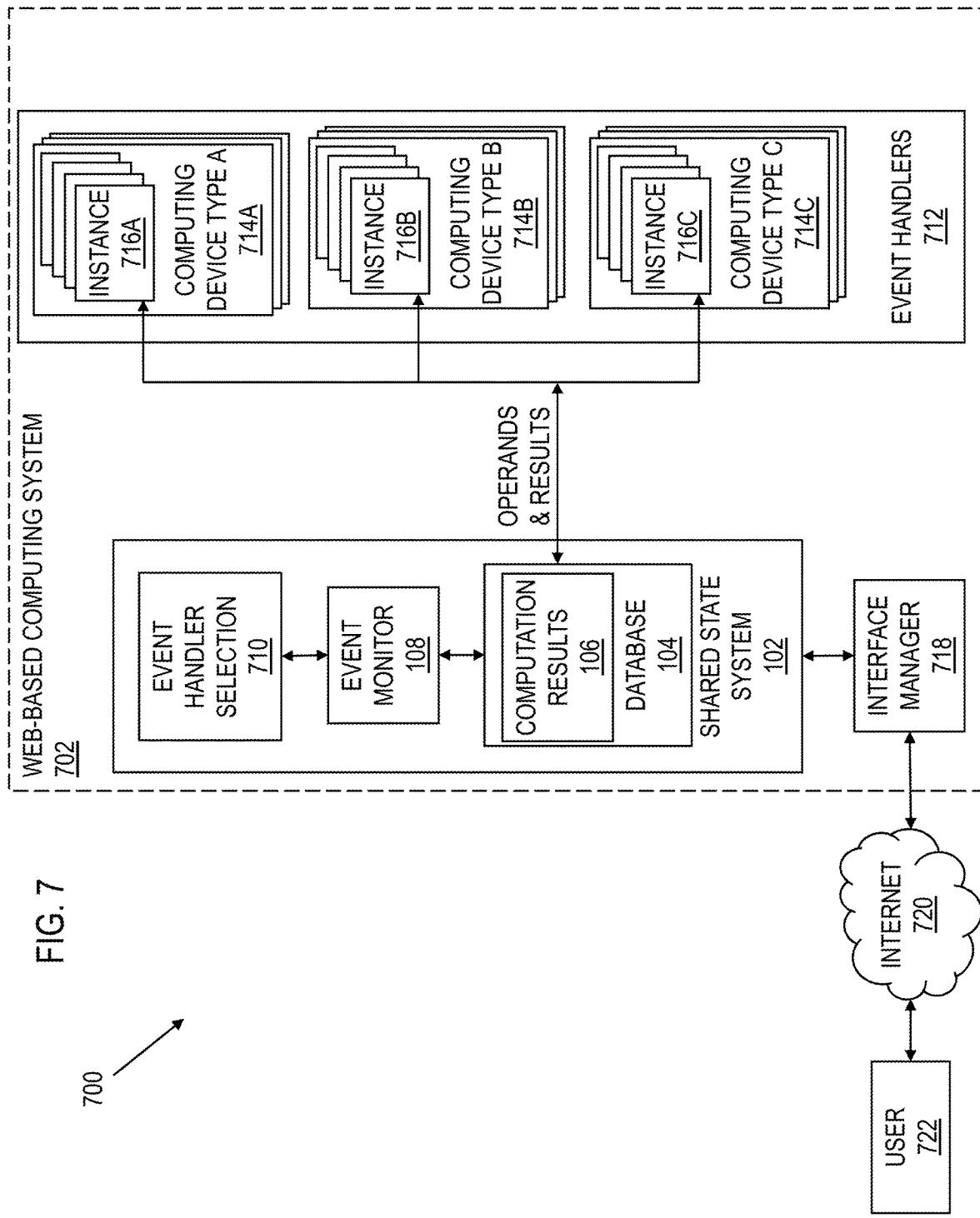
FIG. 7 shows a block diagram for a system for processing computationally intensive workloads in a network-based computing system in accordance with various embodiments.

FIG. 7 shows a block diagram for a system 700 for processing of computationally intensive workloads in a network-based computing system in accordance with various embodiments. The system 700 is an embodiment of the system 100 implemented in a network-based computing system. Network-based computing systems may be set up by an entity such as a company or a public sector organization to provide one or more services (such as various types of cloud-based computing or storage) accessible via the Internet and/or other networks to a distributed set of users. Such a computing system may include numerous data centers hosting various resource pools, such as collections of physical and/or virtualized computer servers, storage devices, networking equipment and the like, needed to implement and distribute the infrastructure and services offered by the provider. The resources may in some embodiments be offered to users in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the computing system in different embodiments, including general purpose or special purpose computer servers, storage devices, network devices and the like. In some embodiments a user may be provided direct access to a resource instance, e.g., by giving a user an administrator login and password. In other embodiments the provider network operator may allow users to specify execution requirements for specified user applications, and schedule execution of the applications on behalf of the user on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without for example requiring the user to access an instance or an execution platform directly. A given execution platform may utilize one or more resource instances in some implementations; in other implementations multiple execution platforms may be mapped to a single resource instance.

In some embodiments the provider network may be organized into a plurality of geographical regions, and each region may include one or more availability zones. An availability zone in turn may comprise one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Users may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Operators of such provider networks may in some instances implement a flexible set of resource reservation, control and access interfaces for their users. For example, a resource manager of the provider network may implement a programmatic resource reservation interface (e.g., via a web site or a set of web pages) that allows users to learn about, select, purchase access to, and/or reserve resource instances. It is noted that in at least some of the various embodiments discussed herein, where an entity such as a resource manager is described as implementing one or more programmatic interfaces such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog, provide details and specifications of the different types or sizes of resources supported, the different reservation types or modes supported, pricing models, and so on.

The system 700 includes the network-based computing system 702 that implements the various elements of the system for processing computationally intensive workloads disclosed herein. The network-based computing system 702 interfaces to a user device 722 via the internet 720. The network-based computing system 702 is configured to provide an interface manager 718, the shared state system 102, and event handlers 110. The interface manager 718 may, in some embodiments, implement one or more programmatic interfaces allowing a user, via the user device 722, to configure and control execution of a computationally intensive application. Via the interface manager 718, a user may provide parameters that configure the application by initializing the shared state system 102, and selecting different types of event handlers 110 that may be allocated on request of the shared state system 102. For example, a user may, via the interface manager 718, introduce programming to be executed by the event handlers 110 to perform the computations associated with the application. The interface manager 718 may also allow a user to monitor the progress of application execution and view results of application execution via the user device 722. The user device 722 may be any of a variety of computing devices that provide for communication via the internet. For example, the user device 722 may be a desktop computer, a notebook computer, a tablet computer, a smart phone, etc.

As explained with regard to the system 100, the event handlers 100 provide the computing resources that perform the computations associated with the application executed by the system 100, and the shared state system 102 controls the allocation of the event handlers 110 for processing of the application. Computing resources such as processing and storage instances of the network-based computing system 702 are configured to operates as and provide the functionality of the shared state system 102 and the event handlers 110.

The shared state system 102 monitors the results of application computations, and determines based on the availability of results produced by prior computations, and/or other factors, whether an event handler 110 should be allocated to compute a new result based on the available results that are relevant to computation of the new result. The event handlers 110 may include different types of computing resources that can be allocated to perform a computation. In the system 700, computing device type A 714A, computing device type B 714B, and computing device type C 714C, which provide different computational capabilities, respectively implement instances 716A, 716B, and 716C which can be allocated to an executing application to provide the computational capabilities of the underlying computing resource 714A, 714B, 714C. For example, computing device type A may provide the computational capabilities of a general-purpose CPU, computing device type B may provide the computational capabilities of a GPU, and computing device type C may provide the computational capabilities of an application specific processor, such as field programmable gate array configured to accelerate specific computations.

The shared state system 102 includes the database 104, the event monitor 108, and event handler allocation and selection logic 710. In some embodiments, the event monitor 108 and/or the event handler allocation and selection logic 710 may be incorporated into the database 104. The database 104 stores computation results 106 produced by the event handlers 110 as part of processing of an application. The computation results may include values computed by an event handler 110, and may also include any state information needed to continue or perform the computation in a different event handler 110. The database 104 may be formed in semiconductor memory or any other storage medium suitable for providing low latency access to the computation results 106. The database 110 may be organized as a relational database, an object oriented database, a NoSQL database, or any other storage structure suitable for storing the results of application computation, state information, computation parameters, and/or other information needed to process a given application in the system 100.

The event monitor 108 is configured to track the updating of computation results generated by the event handlers 110, and based on criteria defining the conditions for performing a given computation, allocate an event handler 110 to perform the given computation. An event, as detected by the event monitor 108, includes the presence of conditions, such as updated computation results 106, that dictate the allocation of an event handler 110 to process the updated computation results 106. For example, an engineering application may simulate a condition at any number of points (e.g., thousands of different points) of a physical structure, and computation of the condition of each point at any particular time may be triggered by updating of computation results stored in the database 104 that serve as inputs to computation of the point. Accordingly, for each point to be simulated, the event monitor 110 may include criteria for triggering computation of a value corresponding to the point. In some embodiments, such triggering criteria may include update or change of a number of input values to a computation, an importance value assigned to the point, and/or a maximum time from a last computation of a value for the point. For example, if N selected computation result values serves as inputs to computation of a value for a given point, then the event monitor 108 may be configured to monitor the N computation result values for updates, and when the N computation result values have been updated the event monitor 108 may trigger allocation of an event handler 110 to compute a new value for the given point.

The event monitor 108 may include logic and processing capability to monitor any number of points defined in the application for input value updates that trigger recomputation of a point. In this manner, the shared state system 102 computes each point of the simulation "as needed," and no processing resources are wasted on computations that may not produce a change in result value. In some embodiments, each event handler 110 may correspond to computation of a result value at a point of a simulation, and the event monitor 108 may trigger allocation of as many event handlers 110 as are needed to update results at a given time.

An importance value may also be assigned to each computation, or each point associated with a computation. An importance value may be stored in the database 102 in association with a result value in some embodiments. The importance value may affect the timing of event handler 110 allocation and computation of a result value. A higher importance value may result in earlier computation, and a lower importance value may result in later computation. For example, a higher importance value may cause the event monitor 108 to trigger computation based on fewer results input to a computation having been updated, and a lower importance value may cause the event monitor 108 to trigger computation based on more results input to a computation having been updated. Thus, a higher importance value may trigger recomputation of a result value earlier than a lower importance value. In some embodiments, an importance value may be adjusted based on a rate of change or magnitude of change of a result value. That is, if a result value's rate of change or magnitude of change is higher, then the result value may be deemed likely to change more quickly in the future and the value's importance increased to provide for earlier update of the value. Similarly, if a result value's rate of change or magnitude of change is lower, then the result value may be deemed likely to change less quickly in the future and the value's importance decreased to provide for later update of the value.

When the event monitor 108 determines that an event handler 110 is to be allocated to perform a computation, the event handler selection logic 710 determines which of the available types of computing devices 714A, 714B, 714C provides the computing capabilities best suited to performing the computation. In some embodiments, the selection may be based on categorization of the computations established when the application is programmed. For example, each different computation to be performed by an event handler 110 as part of application execution may be associated with a type of computing resource or a type of computation that can be associated with a computing resource by the event handler selection logic 710. After the event handler selection logic 710 has selected a type of computing resource, the event handler selection logic 710 allocates an instance 716A, 716B, 716C to provide the computing resource to the computation. The event handler selection logic 710 may communicate with various management systems of the network-based computing system to initiate allocation of the instance. The instance may be a virtual machine, a container-based asset, a hardware device, etc. Allocation of the instance may include selection of a particular computing device (e.g., a particular host) based on the type of computing resource selected by the event handler selection logic 710, loading a machine image onto the computing device, and loading the instructions needed to perform the computation onto the instance.

The newly allocated instance includes no information regarding the computation to be performed or any computation previously performed by the instance or any other instance. The event handler selection logic 710 may configure the allocated instance to perform the computation. Configuration of the instance may include programming the instance (e.g., downloading instructions) to perform the computation and providing operands or references to the operands to the instance. The instance executes the computation and stores the result in the database 104. The instance is deallocated after the computation is completed and the results are stored in the database 104. Writing the result into the database 104 may cause the shared state system 102 to update information associated with the result. For example, an importance value associated with the result may be updated. Writing of the result may also cause the event monitor 108 to trigger allocation of additional instances to perform computations to which the result is an input.

Because embodiments of the system and method disclosed herein are applicable to computationally intensive scientific and engineering simulations, operation of embodiments can be described with respect to such a simulation. Operation will be briefly described with respect to FIG. 8, which shows a two-dimensional array of regions that represent areas of a bar of material 800 whose response to a stimulus is to be simulated. The areas of the bar are numbered to facilitate description, and for each numbered area, or point, a computation can be performed to ascertain conditions at the point. While the bar 800 is subdivided into 100 points in in FIG. 8 as a matter of convenience, in practice a simulation may include any number of points. Description of the operation of embodiments is exemplary, and embodiments may be employed to perform computations for any of a wide variety of applications covering a range of complexities.

Figure 8:
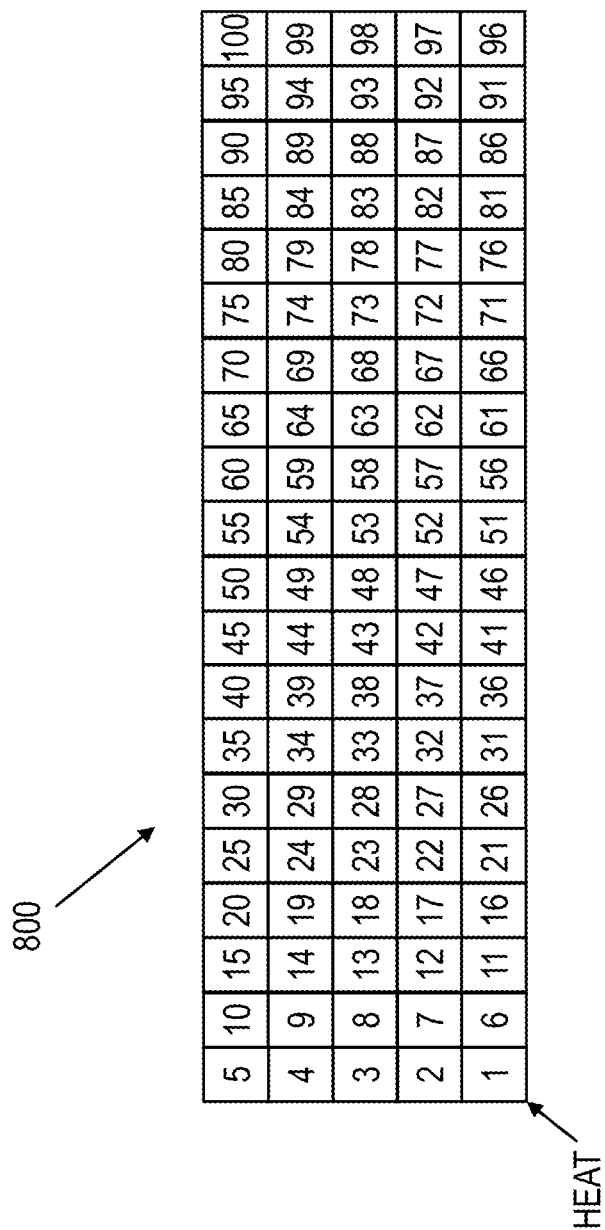
FIG. 8 shows an example of simulation using a system for processing computationally intensive workloads in accordance with various embodiments.

In FIG. 8, heat is applied point 1 and transfer of heat across the bar 800 is simulated over time. The system 700 (or system 100 generally) is initialized for the heat transfer simulation by configuring the database 104 to store computation results for each of the 100 points of the bar 700. The event monitor 108 is configured to associate with each point, others of the 100 points that may serve as inputs to a computation performed for the value of the point. For example, point 7 is surrounded by points 1-3, 6, 8, and 11-13. Accordingly, points 1-3, 6, 8, and 11-13 may be associated with point 7 as inputs, and a threshold value specifying how many of the points, if updated, trigger allocation of an event handler 110 to compute a result for point 7 may be defined. In various embodiments, more or fewer input points may be associated with a given computation.

An importance value may be assigned to each of the 100 points. For example, the points closest to point 1 may be assigned higher importance values than points farther from point 1 because, at the start of the simulation, points closer to point 1 are expected to change temperature more rapidly than points farther from point 1. The computations to be performed are specified to the shared state system 102. If the types of computations to be performed vary, then the computations may be categorized based on the types of computing devices available to perform the computations so that the most suitable computing device may be allocated for a given computation.

After the system 700 has been initialized, the simulation starts by performing computations of temperature at selected points. For example, the temperature at point 1, or any selected points, may be computed. To compute the point temperature values, an event handler 110 is allocated for each point for which a result is to be computed. Accordingly, if the simulation is to be started by computing a value for point 1, then an event handler 110 may allocated and configured to compute the temperature at point 1 based on a value of temperature applied to point one at a given time, the initial temperature values of points 1, 2, 6, 7, parameters of heat flow in the material of the bar 800, etc. The result of the computation for point 1 is stored in the database 104, and the event handler 110 that computed the result for point 1 is deallocated. The event monitor 108 detects the update in the result value for point 1, and in turn may trigger allocation of event handlers 110 to compute temperature values for points to which point 1 serves as an input (e.g., points 2, 6, and 7). Computations continue with a new result for each point 1-100 being computed when a number of updated inputs values for the computation exceed a threshold value.

In early phases of the simulation, points near point 1 will be updated frequently (e.g., due to rapid temperature change), while points farther from point 1 (e.g., points 90-100) are updated more slowly, due to slower heating. Accordingly, early in the simulation more computing resources will be allocated to compute the values of points near point 1, than are allocated to compute the values of points farther from point 1. As the simulation progresses the points farther from point 1 will be updated more quickly, and the points nearer point 1 may be updated more slowly. Consequently, more computing resources may be allocated to computation of points farther from point 1 as the simulation progresses. An event handler 110 is allocated for each point 1-100 being computed, and deallocated when the computation is complete. In this way, computing resources are applied responsive to changes in input, i.e., computation is event driven, to improve efficiency of resource utilization. The event handlers 110 are stateless, thereby allowing utilization of any event handler 110 to perform a required computation for any of the points 1-100.

Figure 9:
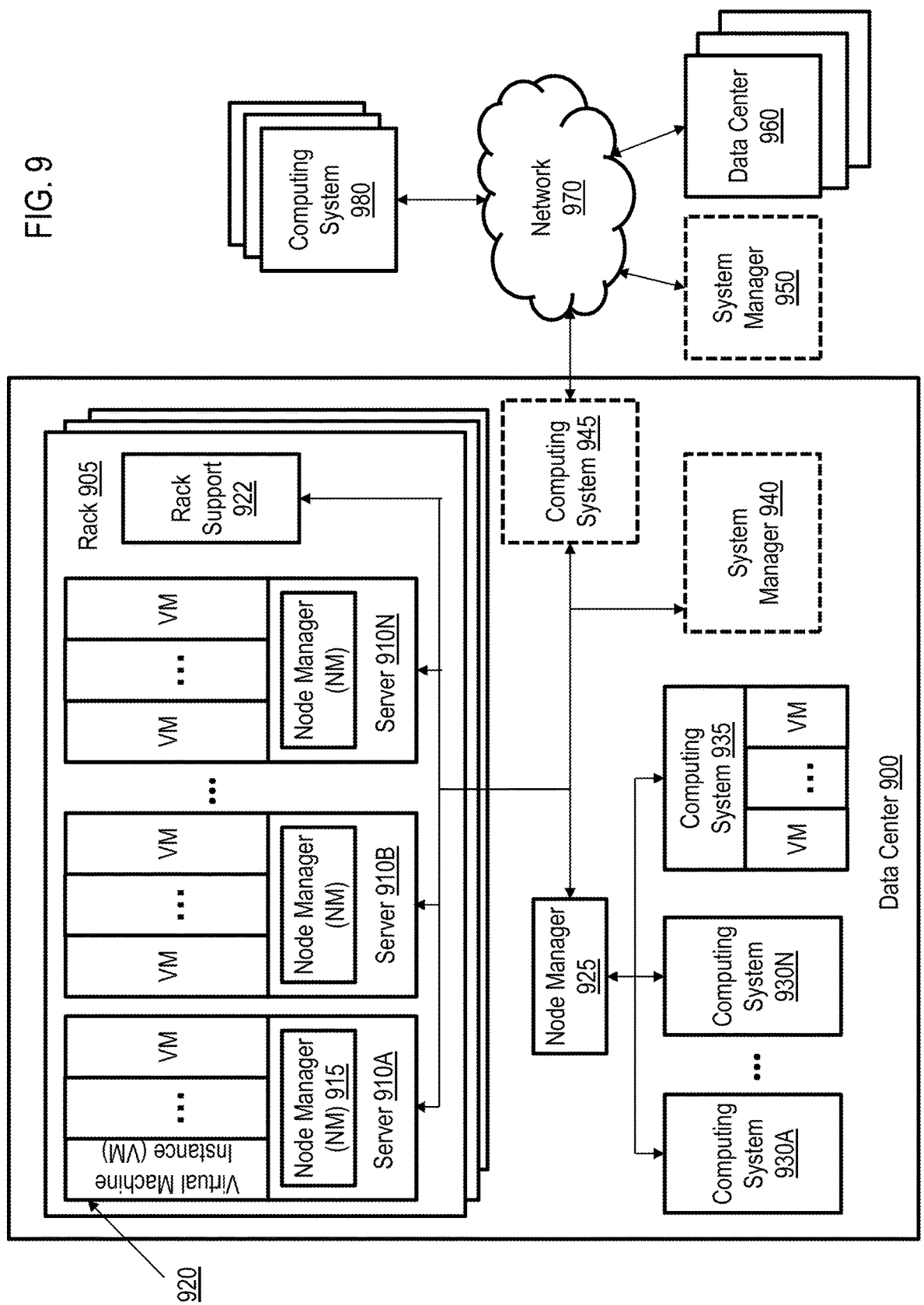
FIG. 9 shows a block diagram for a network-based computing environment suitable for implementation of a system for processing computationally intensive workloads in accordance with various embodiments.

FIG. 9 shows a block diagram for a network-based computing environment suitable for implementation of a system for processing computationally intensive workloads in accordance with various embodiments. In particular, in this example a program execution service manages the execution of programs on various computing systems located within a data center 900. Data center 900 includes a number of racks 905, and each rack includes a number of computing systems 910A-N, as well as a rack support computing system 922 in this example embodiment. The computing systems 910 each host one or more virtual machine instances 920 in this example, as well as a distinct node manager 915 to manage the virtual machines. In this example, each virtual machine 920 may be employed to provide an independent computing environment for executing an instance of program. In this example, the rack support computing system 922 may provide various utility services for other computing systems local to the rack, as well as possibly to other computing systems located in the data center 900. The utility services may include, for example, data and/or program storage for other computing systems, execution of one or more machine manager modules to support other computing systems, etc. Each computing system 910 may alternatively have a distinct machine manager module (e.g., provided as part of the node manager for the computing system) and/or have local storage (not shown) to store local copies of programs. The computing systems 910 and the rack support computing system 922 all share a common data exchange medium in this example, and may all be part of a single group. This common data exchange medium may be connected to one or more external data exchange mediums shared by, for example, other racks or computing systems in the data center 900.

In addition, the example data center 900 further includes additional computing systems 930A-N and 935 that share a common data exchange medium with a node manager 925, and node manager 925 manages computing systems 930 and 935. In the illustrated example, computing system 935 also hosts a number of virtual machines as execution environments for use in executing program instances for one or more users, while computing systems 930 do not host distinct virtual machines. In this example, an optional computing system 945 resides at the interconnect between the data center 900 and an external network 970. The optional computing system 945 may provide a number of services such as acting as a network proxy, managing incoming and/or outgoing data transmissions, etc. Additionally, an optional system manager computing system 940 is also illustrated. The optional system manager computing system 940 may assist in managing the execution of programs on other computing systems located within the data center 900 (or optionally on computing systems located in one or more other data centers 960). The optional system manager computing system 940 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 900 is connected to a number of other systems via a network 970 (e.g., the Internet), including additional computing systems 980 that may be operated by the operator of the data center 900 or third parties such as users, additional data centers 960 that also may be operated by the operator of the data center 900 or third parties, and an optional system manager 950. In a manner similar to system manager 940, the system manager 950 may manage the execution of programs on computing systems located in one or more data centers 900 and/or 960, in addition to providing a variety of other services. Although the example system manager 950 is depicted as external to any particular data center, in other embodiments it may be located within a data center, such as one of the data centers 960.

Figure 10:
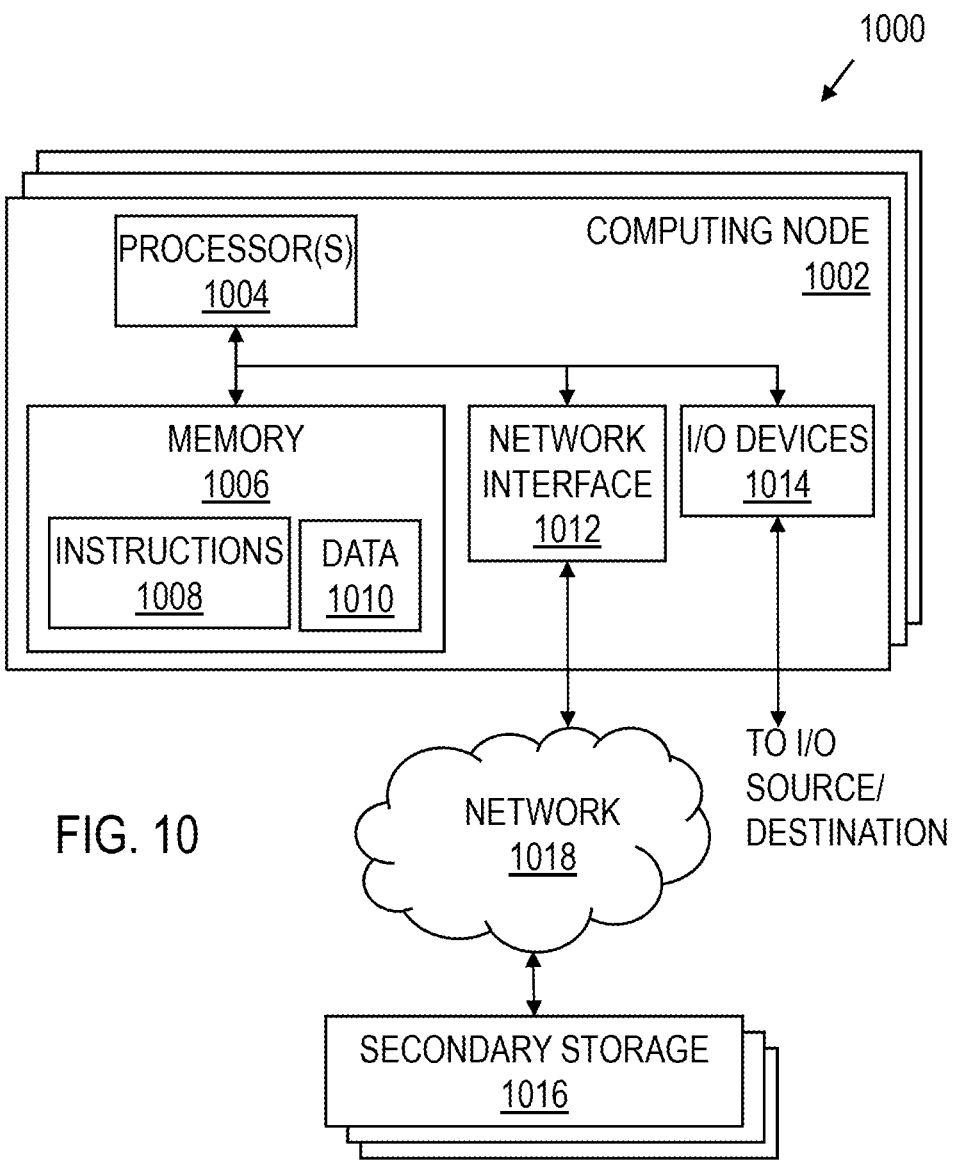
FIG. 10 shows a schematic diagram for a computing system suitable for implementation of a system for processing computationally intensive workloads in accordance with various embodiments.

FIG. 10 shows a schematic diagram for a computing system suitable for implementation of a system for processing computationally intensive workloads in accordance with various embodiments. For example, the network-based computing environment of FIG. 9 and/or system 702 of FIG. 7 may be implemented via embodiments of the computing system 1000. The computing system 1000 includes one or more computing nodes 1002 and secondary storage 1016 that are communicatively coupled via a network 1018. One or more of the computing nodes 1002 and associated secondary storage 1016 may be applied to provide the functionality of the network-based computing system 702, including the shared state system 102, event handlers 110, etc.

Each computing node 1002 includes one or more processors 1004 coupled to memory 1006, network interface 1012, and I/O devices 1014. In some embodiments of the systems 100 and 700, a computing node 1002 may implement the functionality of more than one component of the system 100. In various embodiments, a computing node 1002 may be a uniprocessor system including one processor 1004, or a multiprocessor system including several processors 1004 (e.g., two, four, eight, or another suitable number). Processors 1004 may be any suitable processor capable of executing instructions. For example, in various embodiments, processors 1004 may be general-purpose or embedded microprocessors implementing any of a variety of instruction set architectures (ISAs), such as the x86, PowerPC, SPARC, or MIPS ISAs, or any other suitable ISA. In some embodiments, the processors 1004 may include special purpose processors or accelerators, such as one or more graphics processing unit (GPU), or hardware based accelerators, such gate arrays or programmable gate arrays configured to provide a predetermined processing function. In multiprocessor systems, each of processors 1004 may commonly, but not necessarily, implement the same ISA. Similarly, in a distributed computing system such as one that collectively implements the network-based computing system 702, each of the computing nodes 1002 may implement the same ISA, or individual computing nodes and/or replica groups of nodes may implement different ISAs.

The memory 1006 may include a non-transitory, computer-readable storage medium configured to store program instructions 1008 and/or data 1010 accessible by processor(s) 1004. The system memory 1006 may be implemented using any suitable memory technology, such as static random access memory (SRAM), synchronous dynamic RAM (SDRAM), nonvolatile/Flash-type memory, or any other type of memory. Program instructions 1008 and data 1002 implementing the functionality disclosed herein are stored within system memory 1006. For example, instructions 1008 may include instructions that when executed by processor(s) 1004 implement the shared state system 102, the event handlers 110, and/or other components of the network-based computing system 702 disclosed herein.

Secondary storage 1016 may include volatile or non-volatile storage and storage devices for storing information such as program instructions and/or data as described herein for implementing the network-based computing system 702. The secondary storage may include various types of computer-readable media accessible by the computing nodes 1002 via the network 1018. A computer-readable medium may include storage media or memory media such as semiconductor storage, magnetic or optical media, e.g., disk or CD/DVD-ROM, or other storage technologies. Program instructions and data stored on the secondary storage 1016 may be transmitted to a computing node 1002 for execution by a processor 1004 by transmission media or signals via the network 1018, which may be a wired or wireless network or a combination thereof.

The network interface 1012 may be configured to allow data to be exchanged between computing nodes 1002 and/or other devices coupled to the network 1018 (such as other computer systems, communication devices, input/output devices, or external storage devices). The network interface 1012 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1014 may include one or more display terminals, keyboards, keypads, touchpads, scanning devices, voice or optical recognition devices, or any other devices suitable for entering or retrieving data by one or more computing nodes 1002. Multiple input/output devices 1014 may be present in a computing node 1002 or may be distributed on various computing nodes 1002 of the system 1000. In some embodiments, similar input/output devices may be separate from computing node 1002 and may interact with one or more computing nodes 1002 of the systems 100 or 700 through a wired or wireless connection, such as over network interface 1012.

Those skilled in the art will appreciate that computing system 1000 is merely illustrative and is not intended to limit the scope of embodiments. In particular, the computing system 1000 may include any combination of hardware or software that can perform the functions disclosed herein, including computers, network devices, internet appliances, PDAs, wireless phones, pagers, etc. Computing node 1002 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

Certain terms are used throughout the foregoing description and the following claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be based on Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
configuring a storage system to receive and store results of computations, associated with an application, that are provided by a plurality of event handlers;
configuring event monitoring logic to identify whether a sufficient number of the results have been received by the storage system to trigger allocation of one of the event handlers to the application to process a portion of the results;
monitoring the storage system, by the event monitoring logic, to determine whether the portion of the results have been received by the storage system; and
responsive to the monitoring:
allocating a first one of the event handlers to the application;
retrieving the portion of the results from the storage system;
providing, to the first one of the event handlers, the portion of the results and a specification of a first computation to be performed;
applying, by the first one of the event handlers, the first computation to the portion of the results to produce a new result;
storing the new result in the storage system; and
deallocating the first one of the event handlers from the application.

2. The method of claim 1, wherein, before the allocating and after the deallocating, the first one of the event handlers comprises no information regarding the first computation to be performed.

3. The method of claim 1, further comprising:
determining, based on receipt of the new result, that sufficient results have been stored in the storage system to trigger allocation of a second one of the event handlers to process the new result; and
responsive to the determining:
allocating the second one of the event handlers to the application;
retrieving the new result from the storage system, and providing, to the second one of the event handlers, the new result and a specification of a second computation to be performed;
applying, by the second one of the event handlers, the second computation to the new result to produce a second result;
storing the second result in the storage system; and
deallocating the second one of the event handlers from the application.

4. The method of claim 1, further comprising:
assigning an importance value to each of the computations; and
determining whether to initiate the first computation based on the importance value assigned to the first computation and a number of the results relevant to the first computation that have been received by the storage system.

5. A system, comprising:
a plurality of computing devices configured to implement:
a plurality of event handlers;
a storage system configured to receive and store results of computations, associated with an application, that are provided by the event handlers;
event monitoring logic configured to monitor the storage system to identify whether a sufficient number of the results have been received by the storage system to trigger allocation of one of the event handlers to the application to process at least a portion of the results;
event handler selection logic configured to:
receive a request to trigger allocation of one of the event handlers from the event monitoring logic, and responsive to the request to:
allocate a first one of the event handlers to the application; and
provide, to the first one of the event handlers, a specification of a first computation to be performed; and
wherein the first one of the event handlers is configured to:
apply the first computation to the portion of the results to produce a new result; and
store the new result in the storage system.

6. The system of claim 5, wherein the event handler selection logic or the first one of the event handlers is configured to deallocate the first one of the event handlers from the application responsive to completion of the first computation.

7. The system of claim 6, wherein before the allocation and after deallocation, the first one of the event handlers comprises no information regarding the first computation to be performed.

8. The system of claim 5, wherein results of computations are communicated between different event handlers only via the storage system.

9. The system of claim 5, wherein the storage system is configured to store state information for each of the computations, and the event handler selection logic configured to determine operations of the first computation based on the state information stored in the storage system for the first computation.

10. The system of claim 5, wherein the event monitoring logic is configured to asynchronously initiate each of the computations associated with the application based on identification of changes in data to be processed by the respective computation.

11. The system of claim 5, wherein the event handler selection logic is configured to select the first one of the event handlers from a plurality of different types of event handlers available for allocation to the application based on operations to be performed as part of the first computation.

12. The system of claim 5, wherein the event monitoring logic is configured to:
assign an importance value to each of the computations; and
determine whether to initiate the first computation based on the importance value assigned to the first computation and the number of the results relevant to the first computation that have been received by the storage system.

13. A method, comprising:
monitoring a storage system to determine what portion of results of computations associated with an application have been received by the storage system;
responsive to the monitoring, allocating a first one of a plurality of event handlers to the application to process the portion of results;
retrieving the portion of the results from the storage system;
providing, to the first one of the event handlers, the portion of the results and a specification of a first computation to be performed;
applying, by the first one of the event handlers, the first computation to be performed to the portion of the results to produce a new result;
storing the new result in the storage system; and
deallocating the first one of the event handlers from the application.

14. The method of claim 13, further comprising:
configuring the storage system to receive and store the results of computations, associated with an application, that are provided by the plurality of event handlers;
configuring event monitoring logic to identify whether the portion of results is sufficient to trigger allocation of one of the event handlers to the application to process the portion of results.

15. The method of claim 13, wherein, before the allocating and after the deallocating, the first one of the event handlers comprises no information regarding the first computation to be performed.

16. The method of claim 13, further comprising:
determining, based on receipt of the new result, that sufficient results have been stored in the storage system to trigger allocation of a second one of the event handlers to process the new result; and
responsive to the determining:
allocating the second one of the event handlers to the application;
retrieving the new result from the storage system, and providing, to the second one of the event handlers, the new result and a specification of a second computation to be performed;
applying, by the second one of the event handlers, the second computation to the new result to produce a second result;
storing the second result in the storage system; and
deallocating the second one of the event handlers from the application.

17. The method of claim 13, further comprising:
configuring the storage system to store state information for each of the computations; and
determining operations of the first computation based on the stored state information for the first computation.

18. The method of claim 13, further comprising:
asynchronously initiating each of the computations associated with the application based on identifying changes in data to be processed by the particular computation; and
communicating the results between the event handlers only via the storage system.

19. The method of claim 13, further comprising selecting the first one of the event handlers from a plurality of different types of event handlers available for allocation to the application based on operations to be performed as part of the first computation.

20. The method of claim 13, further comprising:
assigning an importance value to each of the computations; and
determining whether to initiate the first computation based on the importance value assigned to the first computation and the number of results relevant to the first computation that have been received by the storage system.

* * * * *